UNITED STATES PATENT OFFICE.

FRIEDRIK BECKER, OF SCRANTON, PENNSYLVANIA.

IMPROVED COMPOSITION FOR LINING OIL-BARRELS, &c.

Specification forming part of Letters Patent No. 37,848, dated March 10, 1863.

*To all whom it may concern:*

Be it known that I, FRIEDRIK BECKER, of Scranton, county of Luzerne, State of Pennsylvania, have invented a new and improved composition to secure all kinds of barrels, boxes, &c., from leaking, even the kerosene-oil barrels, of which the following is a specification.

The nature of my composition for this purpose consists of the following substances—the proportion of the composition hereinafter mentioned is for about a barrel of forty-gallons capacity: one (1) quart plaster-of-paris, one (1) pound glue, (best quality,) two (2) ounces of rosin, one (1) ounce of turpentine, four (4) ounces of sulphur, and one (1) ounce of shellac. The glue has to be boiled in a quart of water, and after this the other above-mentioned substances will be mixed together and boiled until a complete solution has taken place. The application will be done when the composition is in a state of boiling, and it need not be applied thicker than one-eighth ($\frac{1}{8}$) of an inch or less.

What I claim as my invention, and desire to secure by Letters Patent, is—

The application of the above-mentioned composition to prevent barrels, boxes, &c., from leaking, even kerosene-oil barrels.

FRIEDRIK BECKER

Witnesses:
G. H. HOLTZMAN,
E. L. STEVENS.